United States Patent [19]
Reifenstein, III

[11] Patent Number: 5,796,492
[45] Date of Patent: Aug. 18, 1998

[54] ROTATABLE CONTROL PANEL FOR A SCANNER

[75] Inventor: Edward C. Reifenstein, III, Cambridge, Mass.

[73] Assignee: Agfa Division, Bayer Corporation, Wilmington, Mass.

[21] Appl. No.: 619,784

[22] Filed: Mar. 20, 1996

[51] Int. Cl.[6] ............................. H04N 1/00; G09G 5/00
[52] U.S. Cl. ..................... 358/400; 345/184; 345/156
[58] Field of Search ........................ 345/121, 164, 345/167, 184, 156; 395/155, 156, 161; 358/400, 468; 400/489; 341/22

[56] References Cited

U.S. PATENT DOCUMENTS

| | | | |
|---|---|---|---|
| Re. 34,931 | 5/1995 | Duchon | 250/221 |
| 5,309,172 | 5/1994 | Fox | 345/159 |
| 5,469,194 | 11/1995 | Clark et al. | 345/173 |
| 5,528,523 | 6/1996 | Yoshida | 364/709.11 |
| 5,546,334 | 8/1996 | Hsieh et al. | 364/709.11 |
| 5,572,237 | 11/1996 | Crooks et al. | 345/156 |
| 5,621,436 | 4/1997 | Solhjell | 345/163 |

*Primary Examiner*—Edward L. Coles
*Assistant Examiner*—Kimberly A. Williams
*Attorney, Agent, or Firm*—John A. Merecki

[57] ABSTRACT

An apparatus for changing the orientation of a control panel of a scanning system to provide maximum convenience according to the orientation of the scanning system on a desktop surface. The apparatus comprises a circular control panel rotatably mounted within the main case of the scanning system, together with one or more spring-loaded mechanisms serving to lock the rotatable control panel module in a position set by an operator.

17 Claims, 4 Drawing Sheets

ROTATABLE CONTROL PANEL FOR A SCANNER

FIELD OF THE INVENTION

The present invention relates in general to scanning systems. More particularly, the present invention is directed to an apparatus for selectively changing the orientation of a control panel on a scanning system according to the operational position of the scanning system on a support surface.

BACKGROUND OF THE INVENTION

Currently available scanning systems typically include a control panel which is fixed in a predetermined orientation. Unfortunately, depending upon factors such as the size, configuration, and location of the surface on which the scanning system is supported, the control panel may not be disposed in a readily accessible location. As a consequence, an operator of the scanning system may be forced to assume an awkward body position to view and manipulate the components of the control panel.

SUMMARY OF THE INVENTION

The present invention provides an apparatus for changing the orientation of a control panel on a scanning system to provide for maximum convenience according to the orientation of the scanning system on a support surface. A spring loaded mechanism and a plurality of appropriately located indents allow an operator to rotate the control panel between predefined limits of rotation.

The control panel is normally positioned in an orientation defined by one or more of the indents. To change the orientation, the operator presses down against the panel, moving it out of the indent(s). The panel can then be rotated to a new orientation.

BRIEF DESCRIPTION OF THE DRAWINGS

The features of the present invention will best be understood from a detailed description of a preferred embodiment thereof selected for the purposes of illustration and shown in the accompanying drawings, in which.

DETAILED DESCRIPTION OF INVENTION

Figure 1:
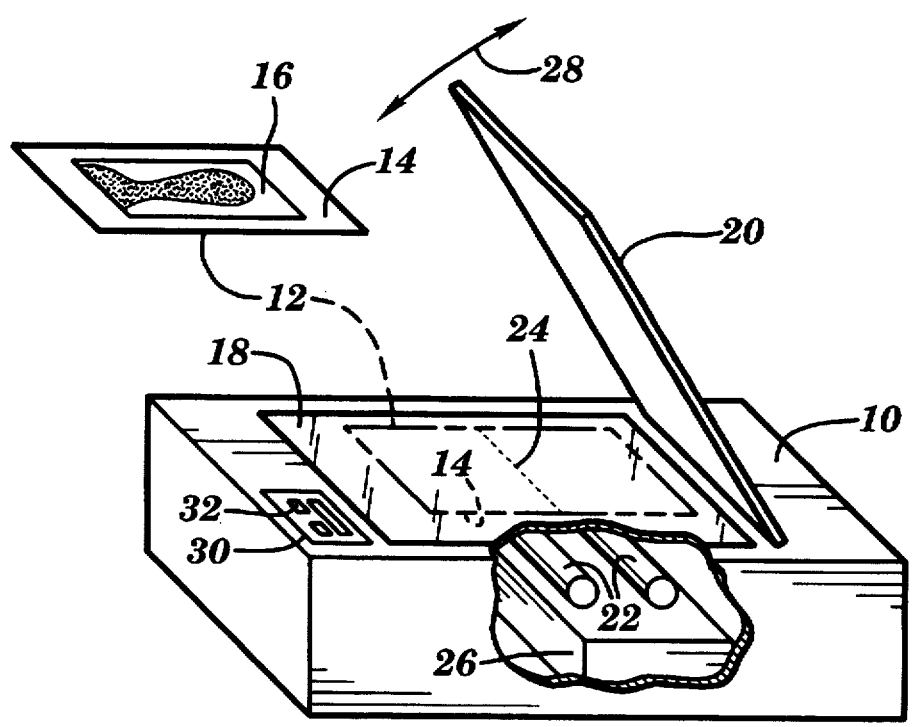
FIG. 1 illustrates a prior art scanning system having a fixed control panel.

In FIG. 1, a prior art scanning system 10 is configured for the scanning of a reflective original 12. The reflective original 12 is placed with the surface 14 containing the image 16 to be scanned facing down on a transparent scanning surface 18, and held in place by a cover 20. The surface is illuminated from below by lamps 22, producing a scan line 24. The scanning optics and sensor electronics are located in a scan module 26, which is driven together with lamps 22 to move the scan line 24 across the length of the original 12, thereby scanning the original 12 to produce a digital representation thereof. The cover 20 is pivotally secured on one side to the main body of the scanning system 10 via a hinge mechanism (not shown), allowing the cover 20 to be raised and lowered as indicated by directional arrow 28 to position one or more reflective originals 12 on the transparent scanning surface 18. The scanning system 10 is controlled via a fixed control panel 30 having a plurality of control items 32, typically comprising a combination of function selector buttons and displays.

Figure 2:
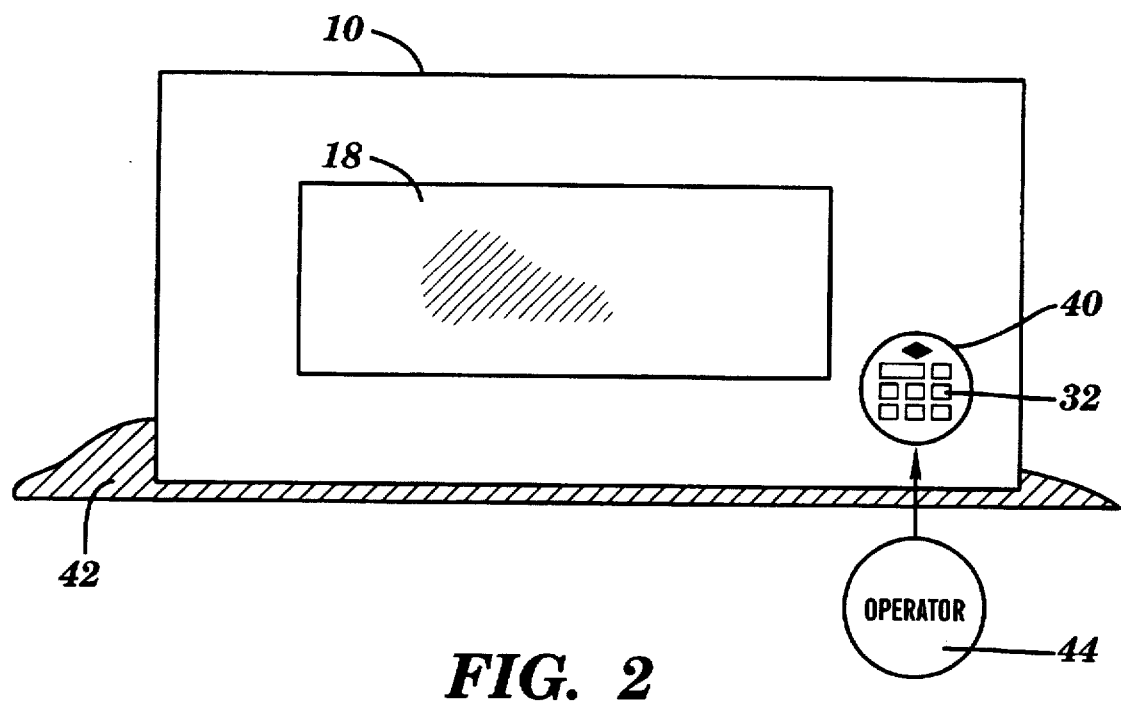
FIG. 2 shows a first orientation of a scanning system having a rotatable control panel.
Figure 3:
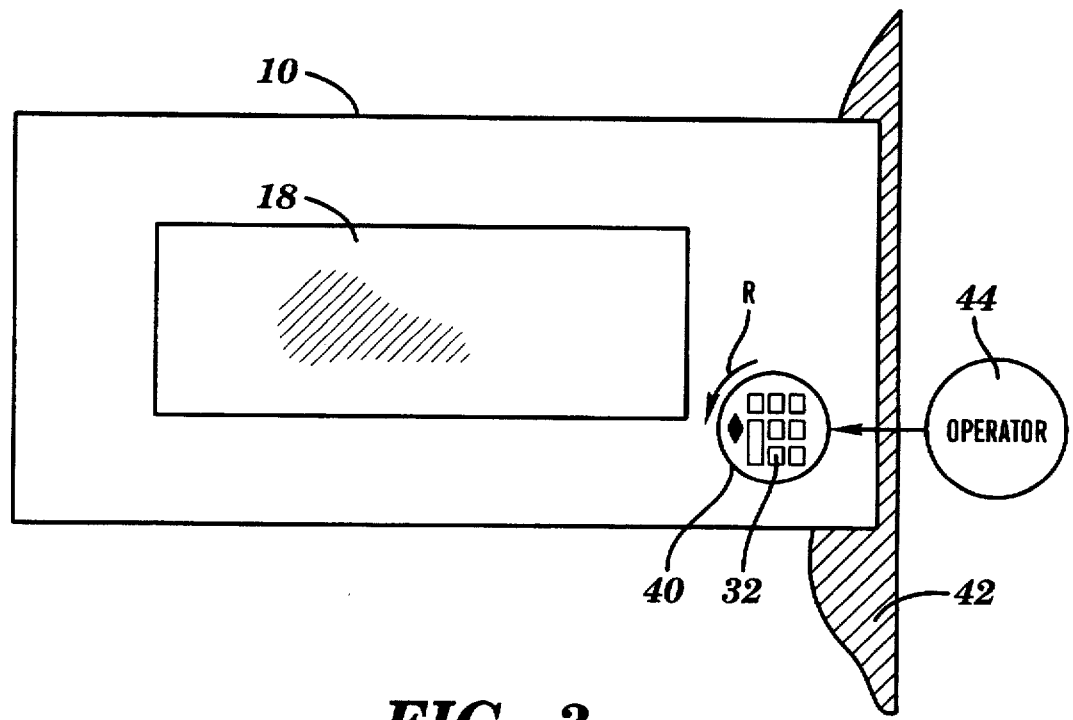
FIG. 3 shows a second orientation of a scanning system having a rotatable control panel.

FIGS. 2 and 3 show two orientations of the scanning system 10, wherein the fixed control panel 30 has been replaced with the rotatable control panel 40 of the present invention. In FIG. 2, the scanning system 10 is placed with the longer side essentially parallel to an edge of a support surface 42, hereinafter assumed to be a desktop. An operator 44 accesses the scanning system 10 for the purpose of positioning material to be scanned on the transparent scanning surface 18, and for the setup and control of the scanning system using the rotatable control panel 40. In FIG. 3, the same scanning system 10 is positioned with the longer side essentially perpendicular to an edge of the support surface 42. In this example, the rotatable control panel 40 has been rotated (directional arrow R) to have the same orientation relative to operator 44 as in the example of FIG. 2. As described in greater detail with reference to FIGS. 4 and 5, rotation of the rotatable control panel 40 is accomplished by pushing down on the panel and rotating it to a desired angular position, with spring loaded indents used to define the most commonly used orientations (e.g., 0°, 45°, 90°, etc.). Although the scanning system orientations of FIG. 2 and FIG. 3 are the most frequently used, other orientations are possible as determined by operator workspace requirements. Accordingly, the rotatable scanner panel 40 can be rotated to any convenient operational position.

Figure 4:
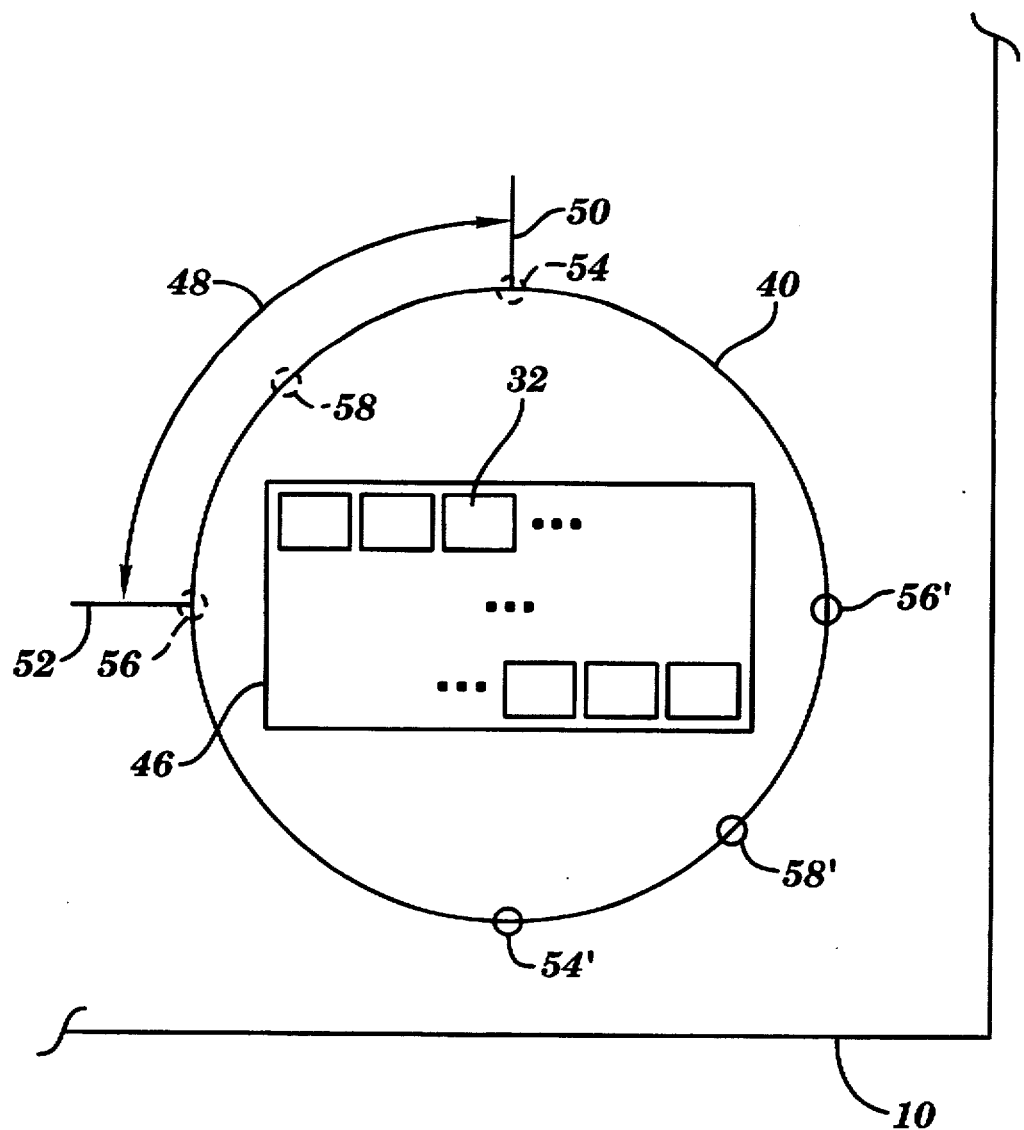
FIG. 4 shows a top view of a rotatable control panel according to the invention; and, FIGS. 5 and 6 provide cross-sectional side views of the rotatable control panel of FIG. 4.

FIG. 4 shows a detailed top view of one possible embodiment of the rotatable control panel 40. In this example, the rotatable control panel 40, again containing an array 46 of control items 32, can be rotated through a range 48 between limit stops 50 and 52 corresponding to indents 54 and 56, respectively. An intermediate indent position 58 is also shown. A corresponding set of symmetrically disposed indents 54', 56', and 58' are also provided. A cross-sectional view of this embodiment, with the rotatable control panel 40 locked at limit stop 50 via indents 54 (and 54'), is illustrated in FIG. 5.

Figure 5:
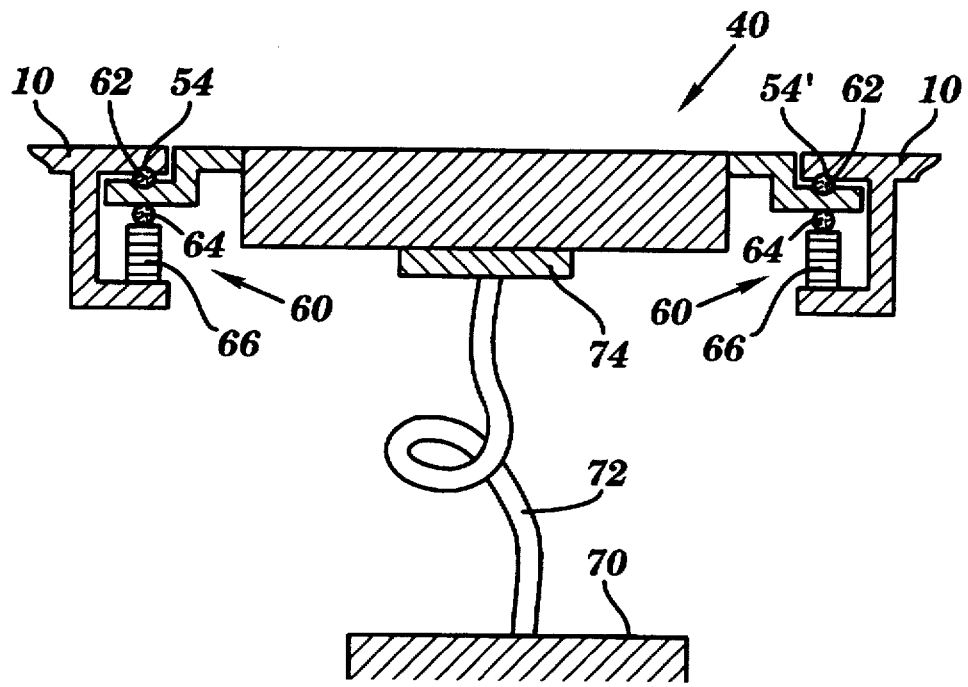
Figure 6:
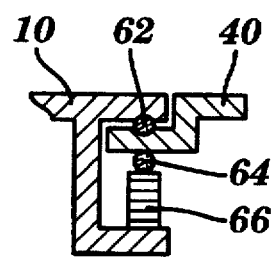

In FIG. 5, the rotatable control panel 40 is held against the top surface of the scanning system 10, within indents 54 and 54', by a pair of spring loaded mechanisms 60 each comprising bearings 62 and 64 and spring 66. As shown, bearings 62 are forced into indents 54 and 54' by springs 66. In FIG. 6, the panel 40 is rotatably positioned between indents 54 and 56. In this position, the bearings 62 are again forced against the top surface of the scanning system by springs 66, albeit not within one of the indents. To rotate the control panel 40, an operator applies a downward force against the panel to counteract the upward bias of the spring loaded mechanism, thereby freeing the bearings 62 from against the top surface of the scanning system.

The rotatable control panel 40 is connected electronically to control electronics 70 using a flexible cable 72 and connector 74. The flexible cable 72 permits the free rotation of the rotatable control panel 40 within the range 48 established by limit stops 50 and 52 (see FIG. 4).

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. An apparatus comprising:
   a scanning system for producing a digital representation of an original;
   a control panel for controlling said scanning system; and
   a system for rotatably mounting said control panel on said scanning system according to an operational position of the scanning system on a support surface.

2. The apparatus according to claim 1, wherein said mounting system further includes:
   a system for establishing a predetermined set of rotational orientations for said control panel.

3. The apparatus according to claim 2, wherein said establishing system further includes:
   a locking system for releasably locking said control panel at each of said predetermined set of rotational orientations.

4. The apparatus according to claim 2, wherein said predetermined set of rotational orientations for said control panel includes more than two rotational orientations.

5. The apparatus according to claim 1, wherein said mounting system further includes:
   a system for limiting the rotation of said control panel.

6. The apparatus according to claim 1, wherein said control panel has a single, predetermined operational orientation relative to an operator of said scanning system, and wherein said system for rotatably mounting said control panel on said scanning system is configured to allow rotation of said control panel to present said control panel to said operator in said single, predetermined operational orientation.

7. The apparatus according to claim 1, wherein said system for rotatably mounting said control panel on said scanning system is configured to allow rotation of said control panel in 90° increments.

8. The apparatus according to claim 1, wherein said system for rotatably mounting said control panel on said scanning system is configured to allow rotation of said control panel in 45° increments.

9. The apparatus according to claim 1, wherein said system for rotatably mounting said control panel on said scanning system is configured to allow rotation of said control panel in increments of less than 180°.

10. The apparatus according to claim 1, wherein said control panel has a circular shape that allows the control panel to be rotated according to the operational position of the scanning system on the support surface.

11. The apparatus according to claim 10, wherein said scanning system includes a circular opening configured to rotatably receive said circularly shaped control panel.

12. The apparatus according to claim 11, further including a releasable locking system including a plurality of indents formed adjacent said circular opening, and a plurality of bearings configured to releasably engage said plurality of indents.

13. The apparatus according to claim 12, wherein said releasable locking system further includes a system for biasing said plurality of bearings into said plurality of indents.

14. The apparatus according to claim 13, wherein said plurality of bearings are released from said plurality of indents when a downward force is applied against said control panel and said control panel is rotated.

15. The apparatus according to claim 1, further including:
    a flexible cable for electronically connecting the control panel to a scanner controller, said flexible cable permitting a free rotation of said control panel with respect to said scanning system.

16. The apparatus according to claim 1, wherein said control panel has a circular shape, and wherein a housing of said scanning system includes a circular opening for rotatably receiving said circularly shaped control panel.

17. The apparatus according to claim 16, wherein said control panel remains completely within said circular opening during rotation.

* * * * *